Dec. 27, 1966 D. N. TINO 3,294,445
SEAT BELT RETRACTOR
Filed Dec. 28, 1964 3 Sheets-Sheet 1
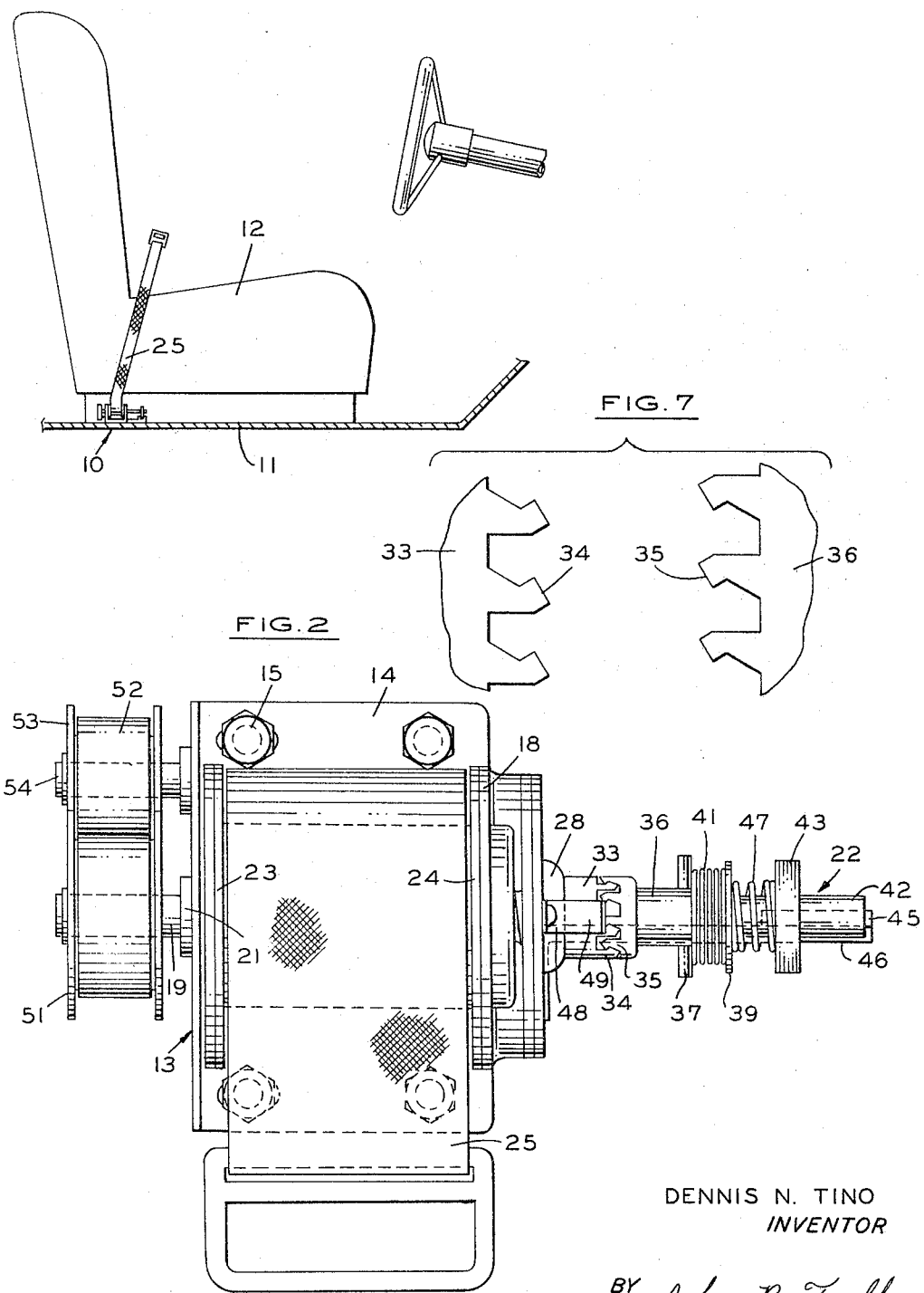
DENNIS N. TINO
INVENTOR
BY John R. Faulkner
John J. Roethel
ATTORNEYS Dec. 27, 1966  D. N. TINO  3,294,445

SEAT BELT RETRACTOR

Filed Dec. 28, 1964  3 Sheets-Sheet 2

DENNIS N. TINO
INVENTOR

BY John R. Faulkner
John J. Roethel
ATTORNEYS

Dec. 27, 1966  D. N. TINO  3,294,445

SEAT BELT RETRACTOR

Filed Dec. 28, 1964  3 Sheets-Sheet 3

DENNIS N. TINO
*INVENTOR*

BY *John R. Faulkner*
*John J. Roethel*
*ATTORNEYS* though to be fully extended from the reel, discontinues
United States Patent Office 3,294,445
Patented Dec. 27, 1966

3,294,445
SEAT BELT RETRACTOR
Dennis N. Tino, Wayne, Mich., assignor to Ford Motor
Company, Dearborn, Mich., a corporation of Delaware
Filed Dec. 28, 1964, Ser. No. 421,465
9 Claims. (Cl. 297—388)

This invention relates generally to retracting mechanisms for motor vehicle seat belts.

More particularly, the present invention relates to a seat belt mechanism which provides for positive locking of the seat belt in any adjusted position, and which further provides for retraction of the belt on a spring loaded reel.

In its simplest form, a reel type seat belt retractor comprises a rotatable shaft or reel from which a section of a belt is unwound when pulled across the body of an occupant of the vehicle seat for connection to a buckle element of a cooperating belt section. The shaft is coupled to a spring which is wound up or placed under increased tension as the belt section is pulled from the reel. The major objection to this simple mechanism is that the seat belt provides full restraint upon the seat occupant only when it has been fully extended from the reel. Frequently, the seat occupant, not realizing that the seat belt must be fully extended from the reel, discontinues his action of extending the belt section as soon as he is able to engage the buckle elements. The belt is then relatively ineffective as a restraining agent because no real restraint is exerted on the seat occupant until the belt slack is fully taken up.

If the seat occupant knows that the belt section extending from the retractor mechanism must be fully extended for proper restraint, he frequently finds that the belt is either too short or too long because of variations between his girth and that of the person who occupied the seat before him. Since the belts are usually anchored to the vehicle floor, movement of the seat in a fore and aft direction to accommodate one or the other of several users of the vehicle also has the effect of shortening or lengthening the belt, as the case may be. For either of these reasons, it becomes necessary to shorten or lengthen one of the belt sections at the buckle to ensure that the belt is properly and effectively fitted.

It is an object of the present invention to provide a seat belt retractor mechanism which permits a seat belt section to be extended as required to make engagement with the buckle of the other belt section. As soon as this buckle engagement is made and upon release of the force tending to extend the belt, the present mechanism provides automatic positive locking of the belt in its adjusted position. The take-up action of the reel, however, remains effective at all times, and in the event that the belt is overextended when connection is made with the buckle of the other belt section, the belt section will be automatically retracted to provide snug engagement around the seat occupant. Any attempt to further extend the belt once the original extending pull has been released is prevented by the mechanism. The belt can only be extended to a new effective length by permitting complete retraction of the belt section and then, after such retraction, by again pulling the belt to the desired length.

This is accomplished by utilizing a one-way clutch mechanism. When the belt section is first pulled from the reel in a belt extending direction, the one-way clutch mechanism is nullified by a clutch action nullifying means. This clutch action nullifying means remains operative until the pull on the belt is released. Any attempt to move the belt section in further extension direction immediately brings the one-way clutch into operation. This results in the reel being locked against rotation in belt section extension direction. During rotation of the reel in belt extension direction, a reel retraction spring is wound up so that the reel is always under a restoring force tending to rotate the reel in a direction to cause retraction of the belt section. After the belt section has been extended to or beyond its desired length, the reel under the influence of the spring will tend to take up any slack in the belt. Upon release of the belt section from the buckle of the other belt section, the spring will automatically cause the reel to retract the belt to fully retracted position.

Other objects, advantages and features of this invention will be made more apparent as this description proceeds, particularly when considered in connection with the accompanying drawings, wherein:

FIG. 1 is a side view diagrammatically illustrating the relationship of a seat belt retracting device embodying the principles of this invention to a motor vehicle seat;

FIG. 2 is a top plan view of a preferred embodiment of the seat belt retractor mechanism;

FIG. 7 is a fragmentary enlarged view showing details of the one-way clutch components of the present mechanism.

Figure 3:
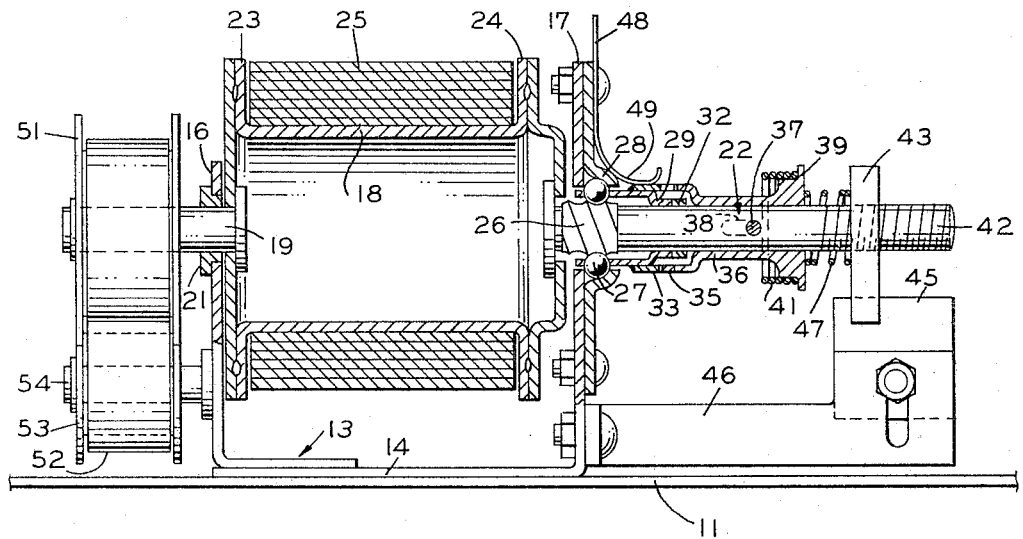
FIG. 3 is a side elevation of FIG. 2, parts of the mechanism being shown in vertical section.

Referring now to the drawings, FIG. 1 illustrates the general environment in which the seat belt retractor mechanism, generally designated 10, is adapted to be used. The seat belt retractor mechanism 10 is preferably supported on the floor 11 of the vehicle body. For bench type seats, the retractor mechanism is preferably mounted on the vehicle floor at the outboard side of the seat 12; for bucket type seats, the retractor mechanism may be mounted on either the inboard or outboard sides of the seat. The number of retractor mechanisms to be used is a matter of choice. For bench type seat vehicles, retractor mechanisms would be installed on the outboard side of the driver's side of the seat and also on the outboard side of the passenger side of the seat. For bucket type seats, a pair of retractors might be furnished for each seat. In most cases, however, only one retractor mechanism is required for each set of seat belts.

The present mechanism is particularly adapted for installations in which one of the belt sections is of a short fixed length. The other belt section is substantially longer and adapted to be extended from a retractor mechanism as required so that a buckle device carried on the free end of the belt may be coupled to a buckle device carried on the free end of the fixed belt. As will become apparent, the present retractor mechanism is particularly suited for this latter type of installation.

The retractor mechanism 10 embodied in the present invention comprises a U-shaped support 13 having a base portion 14 which is bolted to the vehicle floor 11 by bolts 15.

Figure 4:
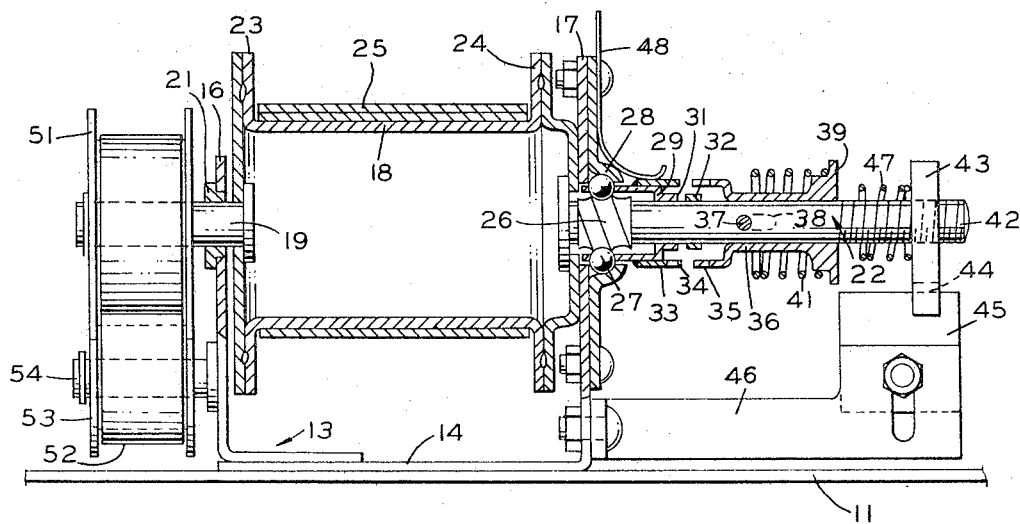
FIG. 4 is a view in part similar to FIG. 3, the parts of the mechanism being shown in a different stage of operation.

The U-shaped support 13 carries between its upstanding legs 16 and 17 a cylindrical shaft or reel 18. The reel 18 is journalled on the leg 16 by a short shaft 19 rotatable in a bushing 21. The reel is journalled relative to the support leg 17 on an elongated shaft 22. Both the shaft 19 and the shaft 22 are fixed to the reel 18 so as to be at all times responsive to rotation of the reel, for purposes to be explained. The reel 18 is provided with end flanges 23 and 24 between which a seat belt section 25 is adapted to be received, as indicated in FIG. 3. At its left end as viewed in FIGS. 3 and 4, the shaft 22 has an external helical ball receiving groove 26 in which a plurality of balls 27 are seated. The balls 27 are maintained in vertical alignment with each other in a ball housing 28 secured to the outer face of the upstanding leg 17 of the support 13. The balls 27 are also encompassed by a cylindrical ball cage 29 interposed between the ball housing 28 and the shaft 22. The purpose of this cage will become apparent as the description proceeds. From the foregoing, it will be understood that shaft 22 is journalled at its left end, as viewed in FIGS. 3 and 4, relative to the support leg 17 by the balls 27.

The ball cage 29 has at its end opposite the end associated with the balls 27 a reduced portion 31 having a slip fit on the shaft 22. A ring 32 is fixed to the shaft 22 and is adapted under certain conditions of operation to abut the reduced end portion of the ball cage portion 31.

The ball cage 29 has mounted thereon a cylindrical ring 33 having a series of axially projecting hook-like tooth elements 34 (see FIGS. 2 and 7). These elements 34 are adapted to be engaged by corresponding elements 35 on an engager 36. The engager 36 is a sleeve-like element journalled for axial sliding movement on the shaft 22. The range of movement of the engager 36 on the shaft 22 is limited by a pin 37 carried by the shaft 22. The pin 37 projects through diametrically opposed axially extending slots 38 in the wall of the engager 36. On its end opposite the end carrying the toothed elements the engager terminates in a enlarged flange 30. A compression spring 41 surrounds the engager between the pin 37 and the flange 39.

At its outboard end 42 the shaft 22 is threaded for engagement with a nut 43. The nut 43 has a slot 44 extending upwardly from its bottom edge. This slot receives the upper edge of a guide plate 45 which is supported on a bracket 46 that extends from the upstanding leg 17 of the support 13 in a direction paralleling the shaft 22. By virtue of this construction and arrangement, rotation of the shaft 22 causes the nut to be moved axially of the shaft toward or from the support 13, depending upon the direction of rotation of the shaft 22. A second compression spring 47 is interposed between the flange 39 on the engager 36 and the opposing face of the nut 43.

The compression spring 47 is an idler spring that acts to delay the action of the return spring 41 as the nut 43 moves away from the engager 36.

A leaf spring 48 secured to the upstanding leg 17 of the support 13 has its free end 49 curved and overlying the cylindrical ring 33 on the ball cage 29. As will be more fully explained, the leaf spring 48 functions as a drag brake which slightly inhibits the rotation of the ball cage 29 under certain conditions of operation.

Figure 5:
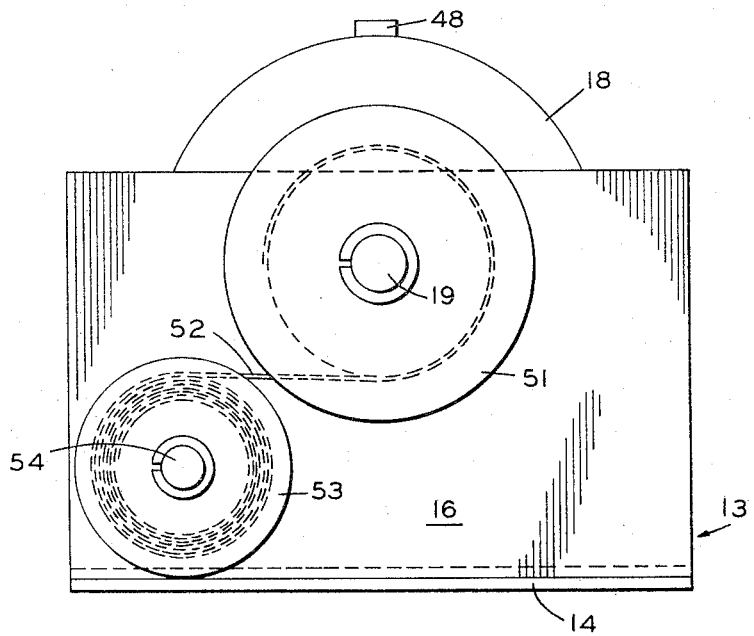
FIG. 5 is an end elevation as seen looking from the left end of FIG. 2.
Figure 6:
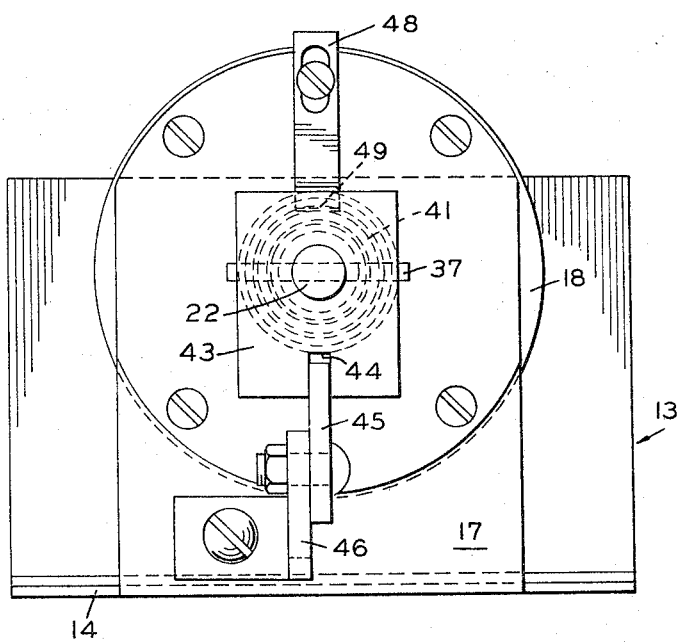
FIG. 6 is an end elevation as seen looking from the right end of FIG. 2.

The end of shaft 19 projecting outboard of the upstanding leg 16 of the support 13 has a spool 51 coupled to it. The free end of a negator or constant load spring 52 is attached to the spool 51. The negator spring is carried on a reel 53 supported on an auxiliary shaft 54 carried on the support 13 (see FIG. 5).

The seat retractor mechanism operates as follows: when the belt section 25 is completely retracted, the shaft 22 is positioned as far to the left as is allowed by the ring 32 bearing against the end face of the end portion 31 of the ball cage 29. The nut 43 is also located at its extreme left position on the shaft 22 causing the engager 36 to engage the cylindrical ring 33 on the ball cage 29 so that the complementary toothed elements 34 and 35 are interlocked, see FIG. 2.

As the belt section 25 is spent or pulled from the reel 18, the relative position of the shaft 22 remains constant to the upstanding leg portion 17 of the support 13. The nut 43 being restrained from rotation by the guide plate 45, begins to traverse along the shaft 22 to the right. As the nut 43 moves away from the engager 36, the compression on the spring 47 is released. The compression of the spring 41 is also decreased to the extent that the spring 41 begins to urge the engager 36 away from the ball cage 29. However, as long as the shaft 22 is caused to rotate, the friction between the engager 36 and ball cage 29 interlocking surfaces or toothed elements 34 and 35 overrides the force of the return spring 41. When the belt section 25 has been pulled or spent from the reel an amount adequate to accommodate the passenger, he will then automatically cease to pull on the belt section. At this time, the friction between the engager 36 and ball cage 29 interlocking or toothed elements 34 and 35 also terminates, and the return spring or compression spring 41 causes these components to disengage. This disengaging action is helped by the leaf spring 48 which was described as being a drag brake and as such causes the ball cage 29 to be relatively free of any overspin which might cause the toothed elements to remain in engagement. During this phase of the unreeling movement of the belt section 25, the shaft 22, the balls 27 and the ball cage 29 have been rotating as a unit within the ball housing 28 thereby journalling the reel 18 for rotation.

During unreeling of the belt section 25, the negator spring 52 is being unwound from its reel 53 onto the spool 51 and is exerting a restoring force tending to rotate the reel 18 in a direction that would cause the belt section to be rewound on the reel. Thus, as the pulling force is released, the belt is retracted snugly against the passenger. Any further extension of the belt section 25 in unreeling direction is prevented. Rotation of the shaft 22 in unreeling direction would cause the shaft to screw through the balls 27 so as to cause the reel to move axially and to become locked against the upstanding leg 17 of the support 15.

The foregoing may be restated as follows: During unreeling action of the belt section 25, the engager 36 causes the one-way clutch elements comprising the balls 27, grooved portion 26 of the shaft 22, and ball cage 29 to rotate as a unit. The engager 36 thereby acts as a one-way clutch nullifying means. Upon a pause in or release of the pulling pressure on the belt section, engager 36 becomes disengaged from the ball cage 29. Further attempted rotation in unreeling direction after the pause results in the pull on the belt section causing a screwing action of the shaft in a direction to cause the reel 18 to be locked against further rotation. The belt section 25 is thus automatically positively locked in its adjusted position. The retraction action of the mechanism is not affected since reverse rotation of the reel 18 causes subsequent re-engagement of the engager 36 with the ball cage 29 so that the reel is freely rotatable in retraction direction.

In the event that the belt section 25 is not extended as far as might be required or desired, the pulling force on the belt must be released so that the latter will substantially completely retract to a position in which the toothed elements 34 and 35 on the ball cage 29 and engager 36, respectively, are re-engaged. It is believed that the advantages gained by providing a seat belt retractor mechanism which will automatically positively lock the seat belt in any adjusted position overrides any slight disadvantage that might be incurred in a mechanism which requires complete retraction of the belt, in the event that the belt is not extended as far as required initially, before re-extension of the belt can be had.

It will be understood that the invention is not to be limited to the exact construction shown and described but that various changes and modifications may be made without departing from the spirit and scope of the invention, as defined in the appended claims.

I claim:
1. In a seat belt retractor mechanism,
   a support,
   a reel means journalled on said support for rotation about a fixed axis of rotation,
   a seat belt section secured at one end thereof to said reel means and adapted in fully retracted position to be wound thereon, shaft means coupled to said reel means coaxially for rotation therewith as said seat belt section unwinds as it is pulled from retracted to extended position, clutch means coaxially coupled to said shaft means for limiting movement of said reel means in belt extending direction, and clutch action nullifying means coaxially mounted on said shaft means operative during movement of said belt section from fully retratced to extended position, said clutch action nullifying means moving longitudinally of said shaft means to an inoperative position upon release of said belt section after having been pulled to a desired extended position, said clutch means becoming operative upon said clutch action nullifying means becoming inoperative to prevent further extension of said belt section.

2. In a seat belt retractor mechanism, a support, a reel having one end of a seat belt secured thereto and about which said belt is adapted to wind and unwind from retracted and extended positions, respectively, said reel being journalled on said support for rotation about a fixed axis of rotation, a shaft means coaxially coupled to said reel for rotation with the latter, one-way clutch means coaxially coupled to said shaft means and adapted to lock the latter and said reel against rotation in belt extending direction, and means coaxially mounted on said shaft means and engageable with said clutch means in fully retracted position of said belt, said last mentioned means remaining in engagement with said clutch means upon the application of force on said belt pulling the latter in extended direction to render said one-way clutch means inoperative to lock said shaft means and reel against rotation in belt extending direction, said last mentioned means moving longitudinally of said shaft means and becoming disengaged from said clutch means upon release of belt pulling force thereby rendering the clutch means operative to prevent further unreeling of the belt.

3. In a seat belt retractor mechanism according to claim 2, spring means coupled to said reel means for urging the latter in belt retraction direction, said one-way clutch means being freewheeling at all times in the direction permitting belt retracting movement of said reel means.

4. In a seat belt retractor mechanism, a support, reel means journalled on said support for rotation about a fixed axis of rotation and adapted to receive a seat belt thereon, shaft means coupled to said reel means, one-way clutch means coaxially interposed between said shaft means and support, said one-way clutch means journalling said reel means and shaft means for rotation on said support, said one-way clutch means being freewheeling at all times for rotation of said reel means in belt winding direction and being freewheeling for rotation of said reel means in belt unwinding direction only as said belt is uninterruptedly unwound from a fully wound to a partially or fully unwound position, and means responsive to interruption of the unwinding pull on said belt to cause said one-way clutch means to automatically lock said reel against further freewheeling rotation in unwinding direction.

5. In a seat belt retractor mechanism according to claim 4, spring means coupled to said reel means for urging the latter in belt winding direction of rotation.

6. In a seat belt retractor mechanism, a support, reel means adapted to receive a belt thereon, shaft means coupled to said reel means, said shaft means having ball engaging groove means at one end thereof and nut engaging threads at the other end, ball means seated in said groove means journalling said shaft means and thereby said reel means on said support, ball cage means encompassing said shaft means and engaged at one end thereof with said ball means, said ball cage means having at the other end thereof toothed elements, engager means journalled on said shaft means for movement axially thereof and having toothed elements engageable with said ball cage means toothed elements, nut means carried on the threaded end of said shaft means, means limiting said nut means to movement axially of said shaft means as the latter is rotated, spring means interposed between said nut means and said engager means urging the latter away from said ball cage means, said nut means in fully wound position of the belt holding said engager means in engagement with said ball cage means against the force of said spring means but being moved axially away from said engager means as the belt is unwound from the reel means, said toothed elements on the ball cage means and engager means remaining frictionally engaged during the unreeling of the belt means whereby the shaft means, ball cage means and balls rotate as a unit, said engager means becoming disengaged from said ball cage means upon cessation of unreeling movement whereby said shaft means is moved axially of the support by screw action of the ball and groove means, axial movement of the shaft means causing the reel means to frictionally bind against the support automatically locking the belt in its adjusted position against further unwinding movement.

7. In a seat belt retractor mechanism according to claim 6, a restoring spring means coupled to said reel means urging said reel means at all times in belt winding direction.

the construction and arrangement of said ball means, groove means on the shaft means and ball cage means being such that the reel means is free-wheeling at all times in belt winding direction.

8. In a seat belt retractor mechanism, a V-shaped support having upstanding support legs, reel means mounted between said legs adapted to receive a belt thereon, one of said support legs having a ball housing thereon, shaft means coupled to said reel means, said shaft means having ball engaging groove means at one end thereof and nut engaging threads at the other end, ball means interposed between said ball housing and said groove means journalling said shaft means and thereby said reel means on said support, ball cage means interposed between said ball housing and said shaft means for engagement at one end with said ball means, said ball cage means having at the other end thereof toothed elements, engager means journalled on said shaft means for movement axially thereof and having toothed elements engageable with said ball cage means toothed elements, nut means carried on the threaded end of said shaft means, means limiting said nut means to movement axially of said shaft means as the latter is rotated therein, spring means interposed between said nut means and engager means urging the latter axially away from said ball cage means, said nut means in fully wound position of the belt holding said engager means interengaged with said ball cage means against the force of said spring means but being moved axially away from said engager means as the belt is unwound from the reel means, said toothed elements on the ball cage means and engager means remaining frictionally engaged during the unreeling of the belt means whereby the shaft means, ball cage means and balls rotate as a unit, said engager means becoming disengaged from said ball cage means upon a pause in unreeling movement whereby said shaft if further unreeling movement is attempted is moved axially of the support by screw action of the ball and groove means, such axial movement of the shaft means causing the reel means to frictionally bind against the support automatically locking the belt in its adjusted position against further unwinding movement.

9. In a seat belt retractor mechanism according to claim 8, a restoring spring means coupled to said reel means urging said reel means at all times in belt winding direction, the construction and arrangement of said ball means, groove means on the shaft means and ball cage means being such that the reel means is freewheeling at all times in belt winding direction.

References Cited by the Examiner

UNITED STATES PATENTS

| 2,843,335 | 7/1958 | Hoven et al. | 297—388 X |
| 2,953,315 | 9/1960 | Lautier et al. | 242—107.4 |
| 3,174,704 | 3/1965 | Replogle | 242—107.4 |
| 3,193,327 | 7/1965 | Roe | 297—388 |
| 3,237,879 | 3/1966 | Whittingham | 242—107.4 |

FRANK B. SHERRY, *Primary Examiner.*

CASMIR A. NUNBERG, *Examiner.*